United States Patent
Liu et al.

(10) Patent No.: US 10,841,949 B2
(45) Date of Patent: Nov. 17, 2020

(54) METHODS AND DEVICES FOR SENDING OR RECEIVING RANDOM ACCESS CONFIGURATION INFORMATION

(71) Applicant: ZTE Corporation, Shenzhen (CN)

(72) Inventors: Kun Liu, Shenzhen (CN); Zhaohua Lu, Shenzhen (CN); Bo Dai, Shenzhen (CN); Shuqiang Xia, Shenzhen (CN); Jing Shi, Shenzhen (CN); Qian Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 151 days.

(21) Appl. No.: 15/535,308

(22) PCT Filed: Apr. 13, 2015

(86) PCT No.: PCT/CN2015/076489
§ 371 (c)(1),
(2) Date: Jun. 12, 2017

(87) PCT Pub. No.: WO2016/090782
PCT Pub. Date: Jun. 16, 2016

(65) Prior Publication Data
US 2017/0332403 A1 Nov. 16, 2017

(30) Foreign Application Priority Data
Dec. 10, 2014 (CN) .......................... 2014 1 0758057

(51) Int. Cl.
*H04W 4/00* (2018.01)
*H04W 74/08* (2009.01)
(Continued)

(52) U.S. Cl.
CPC ............ *H04W 74/08* (2013.01); *H04W 72/04* (2013.01); *H04W 72/12* (2013.01); *H04W 74/004* (2013.01); *H04W 76/10* (2018.02)

(58) Field of Classification Search
CPC . H04W 74/004; H04W 74/08; H04W 72/042; H04W 74/0004; H04W 74/006;
(Continued)

(56) References Cited

U.S. PATENT DOCUMENTS

| 2012/0165058 A1* | 6/2012 | Hwang | H04W 74/006 455/509 |
| 2013/0029657 A1* | 1/2013 | Gao | H04W 74/004 455/422.1 |

(Continued)

FOREIGN PATENT DOCUMENTS

| CN | 10226553 A | 11/2011 |
| CN | 104067583 A | 9/2014 |

(Continued)

OTHER PUBLICATIONS

International Search Report for corresponding application PCT/CN2015/076489 filed on Apr. 13, 2015; dated Aug. 31, 2015.
(Continued)

Primary Examiner — Bob A Phunkulh
(74) Attorney, Agent, or Firm — Cantor Colburn LLP

(57) ABSTRACT

Methods for sending or receiving random access configuration information, devices for sending or receiving random access configuration information, a first-class node and a second-class node are provided. In the method for sending random access configuration information, a first-class node receives one or more first-class reference signals sent by a second-class node, the second-class node may include a node which sends one or more first-class reference signals belonging to a same first-class reference signal subset in a
(Continued)

A first-class node receives one or more first-class reference signals sent by a second-class node, the second-class node may include a node which sends one or more first-class reference signals belonging to a same first-class reference signal subset in a determined time-domain resource set, a first-class reference signal set may include one or more first-class reference signal subsets and each first-class reference signal subset may include one or more first-class reference signals — S102

The first-class node sends random access configuration information to the second-class node according to the one or more received first-class reference signals — S104 determined time-domain resource set, a first-class reference signal set may include one or more first-class reference signal subsets and each first-class reference signal subset may include one or more first-class reference signals (S102). The first-class node sends random access configuration information to the second-class node according to the one or more received first-class reference signals (S104).

15 Claims, 6 Drawing Sheets

(51) Int. Cl.
*H04W 72/12* (2009.01)
*H04W 72/04* (2009.01)
*H04W 76/10* (2018.01)
*H04W 74/00* (2009.01)

(58) Field of Classification Search
CPC ......... H04W 74/0833; H04W 74/0858; H04W 74/0866; H04L 5/0092
See application file for complete search history.

(56) References Cited

U.S. PATENT DOCUMENTS

| | | | | |
|---|---|---|---|---|
| 2013/0242730 A1* | 9/2013 | Pelletier | ............ | H04W 28/0284 370/230 |
| 2014/0086176 A1* | 3/2014 | Liu | ..................... | H04W 74/006 370/329 |
| 2015/0181624 A1* | 6/2015 | Hwang | ................. | H04L 5/0053 370/329 |
| 2015/0365976 A1* | 12/2015 | Lee | ................... | H04W 74/0833 455/422.1 |
| 2016/0066255 A1* | 3/2016 | Marinier | ............... | H04W 48/16 370/350 |
| 2016/0192376 A1* | 6/2016 | Lee | ........................ | H04W 48/20 370/252 |
| 2016/0309517 A1* | 10/2016 | Park | ................. | H04W 56/0005 |

FOREIGN PATENT DOCUMENTS

| | | |
|---|---|---|
| CN | 104184548 A | 12/2014 |
| WO | 2010008180 A2 | 1/2010 |
| WO | 2013069580 A1 | 5/2013 |
| WO | 2013107036 A1 | 7/2013 |

OTHER PUBLICATIONS

3rd Generation Partnership Project; Technical Specification Group Radio Access Network; France, V12.3.0, Sep. 20, 2014, pp. 1-57, XP050925625.

3rd Generation Partnership Project; Technical Specification Group Radio Access Network; France, V12.3.0, Sep. 22, 2014, pp. 1-142, XP050925832.

European Search Report for corresponding application 15 867 482.0; Report dated Oct. 30, 2017.

* cited by examiner

METHODS AND DEVICES FOR SENDING OR RECEIVING RANDOM ACCESS CONFIGURATION INFORMATION

TECHNICAL FIELD

The disclosure relates to the field of communications, and in particular to methods for sending or receiving random access configuration information, devices for sending or receiving random access configuration information, a first-class node and a second-class node.

BACKGROUND

In a related communication technology, a design purpose of a mobile communication system is Human to Human (H2H) communication. In recent years, along with rapid development of an Internet of things technology, communication of Machine to Machine (M2M) users also has become one of important design purposes of a future mobile communication system. Considering a large number of M2M users, how to ensure a large number of M2M users to successfully access a future mobile communication system in the system is an important subject.

In a mobile communication system in the related communication technology, for example, in a Long Term Evolution (LTE) system, users may be ensured to successfully access the system in a manner of pre-allocating Physical Random Access Channels (PRACHs) and randomly allocating random access preambles. For ensuring that collision probabilities are relatively low and system access delays are relatively short when the users access the system, numbers of the PRACHs and the random access preambles are usually far larger than the number of the users required to access the system. However, a huge number of users may desire to access a future mobile communication system, and a system access solution for the users in the related communication technology may cause high system resource overhead, and is inapplicable to the future mobile communication system.

For the problem that a system access solution for users in the related communication technology may cause high system resource overhead during access of a large number of users, there is yet no effective solution at present.

SUMMARY

Some embodiments of the disclosure provide methods for sending or receiving random access configuration information, devices for sending or receiving random access configuration information, a first-class node and a second-class node, so as to at least solve the problem that a system access solution for users in the related communication technology may cause high system resource overhead during access of a large number of users in the related communication technology.

According to an embodiment of the disclosure, a method for sending random access configuration information is provided, which may include the following acts. A first-class node receives one or more first-class reference signals sent by a second-class node. The second-class node may include a node which sends one or more first-class reference signals belonging to a same first-class reference signal subset in a determined time-domain resource set. A first-class reference signal set may include one or more first-class reference signal subsets and each first-class reference signal subset may include one or more first-class reference signals. The first-class node sends random access configuration information to the second-class node according to the one or more received first-class reference signals.

The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The method for sending random access configuration information may further include at least one of the followings. The type of the random access sequence is the same as a type of the one or more first-class reference signals. A length of the circle prefix in the random access signalling is determined based on a measured maximum delay of the one or more received first-class reference signals. A length of the circle postfix in the random access signalling is determined based on a measured maximum delay of the one or more received first-class reference signals. A length of a circle shift of the random access sequence is determined based on a measured maximum delay of the one or more received first-class reference signals.

The act that the first-class node sends the random access configuration information to the second-class node according to the one or more received first-class reference signals may include the following act. The first-class node may send different random access configuration information to different second-class nodes according to different first-class reference signal subsets to which received first-class reference signals belong.

The second-class node may include at least one of: H2H communication User Equipment (UE); M2M communication UE; or Device to Device (D2D) communication UE.

According to another embodiment of the disclosure, a method for receiving random access configuration information is provided, which may include the following acts. A second-class node receives resource allocation information, sent by a first-class node, of first-class reference signals. The second-class node sends one or more first-class reference signals selected from a first-class reference signal subset to the first-class node according to the received resource allocation information of first-class reference signals. The second-class node receives specific random access configuration information sent by the first-class node.

The second-class node may send a random access signalling to the first-class node according to the random access configuration information after receiving the random access configuration information.

The resource allocation information of first-class reference signals may include at least one of: number information of first-class reference signal subsets included in a first-class reference signal set; number information of first-class reference signals included in each first-class reference signal subset; or information of first-class reference signals included in each first-class reference signal subset.

The specific random access configuration information may include random access configuration information of a second-class node in a specific set.

The second-class node in the specific set may include: a second-class node which sends one or more first-class reference signals belonging to a same first-class reference signal subset in a determined time-frequency resource set.

The act that the second-class node sends the one or more first-class reference signals selected from the first-class reference signal subset to the first-class node according to the received resource allocation information of first-class reference signals may include the following act. The second-class node sends the one or more first-class reference signals in a determined time-domain resource set. The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

After the act that the second-class node receives the specific random access configuration information sent by the first-class node, the method may further include the following act. When the second-class node has yet not sent the one or more first-class reference signals before receiving the random access configuration information sent by the first-class node, the second-class node may decode the received specific random access configuration information.

Under a condition that the second-class node fails to decode the received specific random access configuration information, the second-class node may send the one or more first-class reference signals.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The method for receiving random access configuration information may include at least one of the followings. The type of the random access sequence is the same as a type of the one or more first-class reference signals. A length of the circle prefix in the random access signalling is determined based on a measured maximum delay of the one or more first-class reference signals received by the first-class node. A length of the circle postfix in the random access signalling is determined based on a measured maximum delay of the one or more first-class reference signals received by the first-class node. A length of a circle shift of the random access sequence is determined based on a measured maximum delay of the one or more first-class reference signals received by the first-class node.

The first-class node may include at least one of: a macro cell, a micro cell, a pico cell, a femto cell, a home cell, a Low Power Node (LPN) or a relay.

According to another embodiment of the disclosure, a device for sending random access configuration information is provided, which may be applied to a first-class node and may include a first receiving module and a first sending module. The first receiving module is arranged to receive one or more first-class reference signals sent by a second-class node. The second-class node may include a node which sends one or more first-class reference signals belonging to a same first-class reference signal subset in a determined time-domain resource set. A first-class reference signal set may include one or more first-class reference signal subsets and each first-class reference signal subset may include one or more first-class reference signals. The first sending module is arranged to send random access configuration information to the second-class node according to the one or more received first-class reference signals.

The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The device for sending random access configuration information may comply with least one of the followings. The type of the random access sequence is the same as a type of the one or more first-class reference signals. A length of the circle prefix in the random access signalling is determined based on a measured maximum delay of the one or more received first-class reference signals. A length of the circle postfix in the random access signalling is determined based on a measured maximum delay of the one or more received first-class reference signals. A length of a circle shift of the random access sequence is determined based on a measured maximum delay of the one or more received first-class reference signals.

The first sending module may be arranged to send different random access configuration information to different second-class nodes according to different first-class reference signal subsets to which received first-class reference signals belong.

The second-class node may include at least one of: H2H communication UE; M2M communication UE; or D2D communication UE.

According to another embodiment of the disclosure, a device for receiving random access configuration information is provided, which may be applied to a second-class node and may include a second receiving module, a second sending module and a third receiving module. The second receiving module is arranged to receive resource allocation information, sent by a first-class node, of first-class reference signals. The second sending module is arranged to send one or more first-class reference signals selected from a first-class reference signal subset to the first-class node according to the received resource allocation information of first-class reference signals. The third receiving module is arranged to receive specific random access configuration information sent by the first-class node.

The device for receiving random access configuration information may further include a third sending module. The third sending module is arranged to send a random access signalling to the first-class node according to the random access configuration information.

The resource allocation information of first-class reference signals may include at least one of: number information of first-class reference signal subsets included in a first-class reference signal set; number information of first-class reference signals included in each first-class reference signal subset; or information of first-class reference signals included in each first-class reference signal subset.

The specific random access configuration information may include random access configuration information of a second-class node in a specific set.

The second-class node in the specific set may include: a second-class node which sends one or more first-class reference signals belonging to a same first-class reference signal subset in a determined time-frequency resource set.

The second sending module may be arranged to send the one or more first-class reference signals in a determined time-domain resource set. The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

The device for receiving random access configuration information may further include a decoding module. The decoding module may be arranged to, when the second-class node has yet not sent the one or more first-class reference signals before receiving the random access configuration information sent by the first-class node, decode the received specific random access configuration information.

The device for receiving random access configuration information may further include a fourth sending module. The fourth sending module may be arranged to, under a condition that the decoding module fails in decoding, send the one or more first-class reference signals.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The device for receiving random access configuration information may comply with least one of the followings. The type of the random access sequence is the same as a type of the one or more first-class reference signals. A length of the circle prefix in the random access signalling is determined based on a measured maximum delay of the one or more first-class reference signals received by the first-class node. A length of the circle postfix in the random access signalling is determined based on a measured maximum delay of the one or more first-class reference signals received by the first-class node. A length of a circle shift of the random access sequence is determined based on a measured maximum delay of the one or more first-class reference signals received by the first-class node.

The first-class node may include at least one of: a macro cell, a micro cell, a pico cell, a femto cell, a home cell, an LPN or a relay.

According to another embodiment of the disclosure, a first-class node is provided, which may include any abovementioned device for sending random access configuration information.

The first-class node may include at least one of: a macro cell, a micro cell, a pico cell, a femto cell, a home cell, an LPN or a relay.

According to another embodiment of the disclosure, a second-class node is provided, which may include any abovementioned device for receiving random access configuration information.

The second-class node may include at least one of: H2H communication UE; M2M communication UE; or D2D communication UE.

The embodiments of the disclosure adopt the following technical solution. A first-class node receives one or more first-class reference signals sent by a second-class node. The second-class node may include a node which sends one or more first-class reference signals belonging to a same first-class reference signal subset in a determined time-domain resource set. The first-class reference signal set may include one or more first-class reference signal subsets and each first-class reference signal subset may include one or more first-class reference signals. The first-class node sends the random access configuration information to the second-class node according to the one or more received first-class reference signals. The problem that a system access solution for users in the related communication technology may cause high system resource overhead during access of a large number of users is solved, and an effect of reducing the resource overhead is further achieved.

BRIEF DESCRIPTION OF THE DRAWINGS

The drawings described here are adopted to provide a further understanding to the disclosure, and form a part of the disclosure. Schematic diagrams of the disclosure and descriptions thereof are adopted to explain the disclosure and not intended to form limits to the disclosure. In the drawings.

DETAILED DESCRIPTION OF THE EMBODIMENTS

The disclosure will be described below in detail with reference to the drawings and embodiments. It is important to note that the embodiments in the disclosure and characteristics in the embodiments may be combined under the condition of no conflicts.

Figure 1:
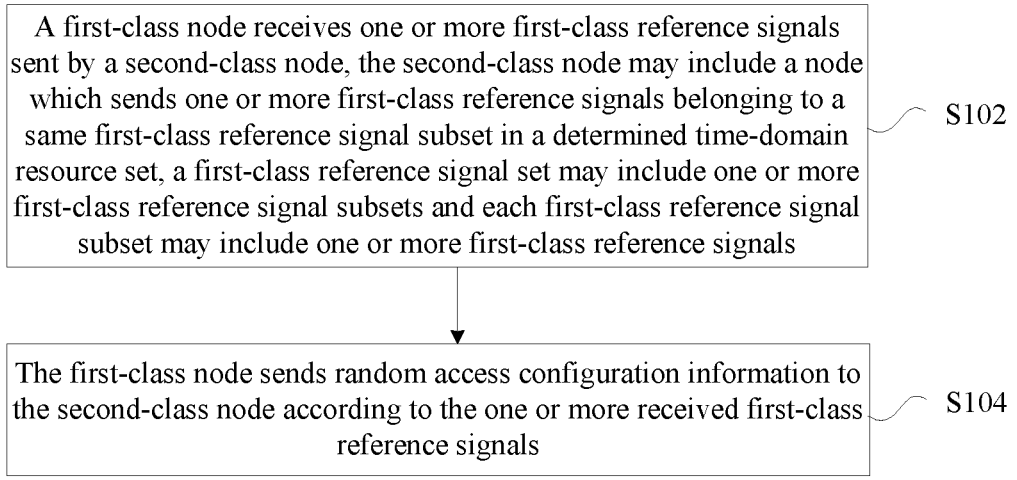
FIG. 1 is a flowchart of a method for sending random access configuration information according to an embodiment of the disclosure.

An embodiment provides a method for sending random access configuration information. FIG. 1 is a flowchart of a method for sending random access configuration information according to an embodiment of the disclosure. As shown in FIG. 1, the method may include the following acts S102 to S104.

At act S102, a first-class node receives one or more first-class reference signals sent by a second-class node. The second-class node may include a node which sends one or more first-class reference signals belonging to a same first-class reference signal subset in a determined time-domain resource set. A first-class reference signal set may include one or more first-class reference signal subsets and each first-class reference signal subset may include one or more first-class reference signals.

At act S104, the first-class node sends random access configuration information to the second-class node according to the one or more received first-class reference signals.

By the acts, the first-class node sends the random access configuration information to the second-class node according to the one or more first-class reference signals sent by the second-class node, thereby effectively reducing resource overhead. In this way, the problem that a system access solution for users in the related communication technology may cause high system resource overhead during access of a large number of users is solved, and an effect of reducing the resource overhead is further achieved.

The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

In an exemplary embodiment, a type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

There may be multiple types of random access configuration information. In an exemplary embodiment, the random access configuration information may include at least one of: PRACH configuration information, random access signalling configuration information, or indication information indicating whether to resend the one or more first-class reference signals or not.

When the random access configuration information may include the PRACH configuration information, the PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may be determined at least one of the following manners: a period configured in a manner of sending the period to the second-class node by the first-class node through signalling; or a period configured in the first-class node and the second-class node in a predetermined manner.

When the PRACH configuration information may include the starting time information of the PRACH, the starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

When the random access signalling configuration information is the type of the random access sequence, the type of the random access sequence may include at least one of: a predetermined sequence, an orthogonal sequence, a quasi-orthogonal sequence or a pseudo-random sequence, and the orthogonal sequence may include a Zadoff chu sequence.

In an exemplary embodiment, the method may further include at least one of the follows. The type of the random access sequence is the same as a type of the one or more first-class reference signals. A length of the circle prefix in the random access signalling is determined based on a measured maximum delay of the one or more received first-class reference signals. A length of the circle postfix in the random access signalling is determined based on a measured maximum delay of the one or more received first-class reference signals. A length of a circle shift of the random access sequence is determined based on a measured maximum delay of the one or more received first-class reference signals.

The act that the first-class node sends the random access configuration information to the second-class node according to the one or more received first-class reference signals may include the following act. The first-class node may send different random access configuration information to different second-class nodes according to different first-class reference signal subsets to which received first-class reference signals belong.

In an exemplary embodiment, the second-class node may include at least one of: H2H communication UE; M2M communication UE; or D2D communication UE.

Figure 2:
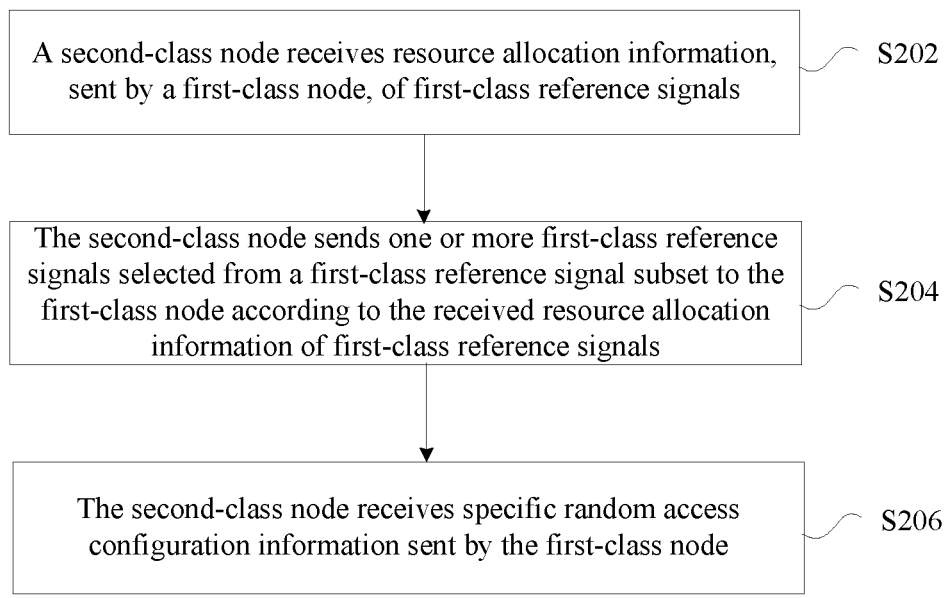
FIG. 2 is a flowchart of a method for receiving random access configuration information according to an embodiment of the disclosure.

An embodiment of the disclosure provides a method for receiving random access configuration information. FIG. 2 is a flowchart of a method for receiving random access configuration information according to an embodiment of the disclosure. As shown in FIG. 2, the method may include the following acts S202 to S206.

At act S202, a second-class node receives resource allocation information, sent by a first-class node, of first-class reference signals.

At act S204, the second-class node sends one or more first-class reference signals selected from a first-class reference signal subset to the first-class node according to the received resource allocation information of first-class reference signals.

At act S206, the second-class node receives specific random access configuration information sent by the first-class node.

By the acts, the second-class node selects one or more first-class reference signals according to the resource allocation information and receives the random access configuration information sent by the first-class node according to the one or more first-class reference signals. In this way, the problem that a system access solution for users in the related communication technology may cause high system resource overhead during access of a large number of users is solved, and an effect of reducing the resource overhead is further achieved.

The second-class node may send a random access signalling to the first-class node according to the random access configuration information after receiving the random access configuration information.

In an exemplary embodiment, the resource allocation information of first-class reference signals may include at least one of: number information of first-class reference signal subsets included in a first-class reference signal set; number information of first-class reference signals included in each first-class reference signal subset; or information of first-class reference signals included in each first-class reference signal subset.

In an exemplary embodiment, the specific random access configuration information may include random access configuration information of a second-class node in a specific set.

The second-class node in the specific set may include: a second-class node which sends one or more first-class reference signals belonging to a same first-class reference signal subset in a determined time-frequency resource set.

The act that the second-class node sends the one or more first-class reference signals selected from the first-class reference signal subset to the first-class node according to the received resource allocation information of first-class reference signals may include the following act. The second-class node sends the one or more first-class reference signals in a determined time-domain resource set, and the determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

After the act that the second-class node receives the specific random access configuration information sent by the first-class node, the method may further include the following acts. When the second-class node has yet not sent the one or more first-class reference signals before receiving the random access configuration information sent by the first-class node, the second-class node may decode the received specific random access configuration information.

Under a condition that the second-class node fails to decode the received specific random access configuration information, the second-class node sends the one or more first-class reference signals.

There may be multiple types of first-class reference signals. In an exemplary embodiment, a type of the one or more first-class reference signals may include at least one of: a predetermined signal, a predetermined sequence, an orthogonal sequence, a quasi-orthogonal sequence or a pseudo-random sequence, and the orthogonal sequence may be a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The method for receiving random access configuration information may further include at least one of the followings. The type of the random access sequence is the same as a type of the one or more first-class reference signals. A length of the circle prefix in the random access signalling is determined based on a measured maximum delay of the one or more first-class reference signals received by the first-class node. A length of the circle postfix in the random access signalling is determined based on a measured maximum delay of the one or more first-class reference signals received by the first-class node. A length of a circle shift of the random access sequence is determined based on a measured maximum delay of the one or more first-class reference signals received by the first-class node.

The first-class node may include at least one of: a macro cell, a micro cell, a pico cell, a femto cell, a home cell, an LPN or a relay.

An embodiment further provides a device for sending random access configuration information. The device is arranged to implement the abovementioned embodiments and exemplary implementation modes, and what has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 3:
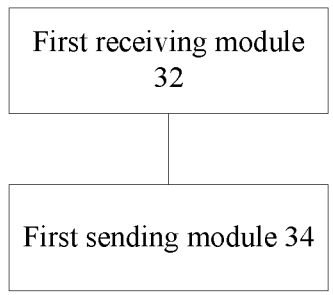
FIG. 3 is a structure block diagram of a device for sending random access configuration information according to an embodiment of the disclosure.

FIG. 3 is a structure block diagram of a device for sending random access configuration information according to an embodiment of the disclosure. The device is applied to a first-class node. As shown in FIG. 3, the device may include a first receiving module 32 and a first sending module 34. The device will be described below.

The first receiving module 32 is arranged to receive one or more first-class reference signals sent by a second-class node. The second-class node may include a node which sends one or more first-class reference signals belonging to a same first-class reference signal subset in a determined time-domain resource set. A first-class reference signal set may include one or more first-class reference signal subsets and each first-class reference signal subset may include one or more first-class reference signals. The first sending module 34 is coupled to the first receiving module 32, and is arranged to send random access configuration information to the second-class node according to the one or more received first-class reference signals.

In an exemplary embodiment, the determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset may be configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The device for sending random access configuration information may include at least one of the followings. The type of the random access sequence is the same as a type of the one or more first-class reference signals. A length of the circle prefix in the random access signalling is determined based on a measured maximum delay of the one or more received first-class reference signals. A length of the circle postfix in the random access signalling is determined based on a measured maximum delay of the one or more received first-class reference signals. A length of a circle shift of the random access sequence is determined based on a measured maximum delay of the one or more received first-class reference signals.

In an exemplary embodiment, the first sending module 34 may be arranged to send different random access configuration information to different second-class nodes according to different first-class reference signal subsets to which received first-class reference signals belong.

The second-class node may include at least one of: H2H communication UE; M2M communication UE; or D2D communication UE.

Figure 4:
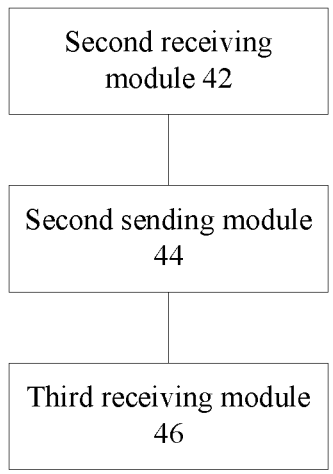
FIG. 4 is a structure block diagram of a device for receiving random access configuration information according to an embodiment of the disclosure.

FIG. 4 is a structure block diagram of a device for receiving random access configuration information according to an embodiment of the disclosure. The device is applied to a second-class node. As shown in FIG. 4, the device may include a second receiving module 42, a second sending module 44 and a third receiving module 46. The device will be continuously described below.

The second receiving module 42 is arranged to receive resource allocation information, sent by a first-class node, of first-class reference signals. The second sending module 44 is coupled to the second receiving module 42, and is arranged to send one or more first-class reference signals selected from a first-class reference signal subset to the first-class node according to the received resource allocation information of first-class reference signals. The third receiving module 46 is coupled to the second sending module 44, and is arranged to receive specific random access configuration information sent by the first-class node.

Figure 5:
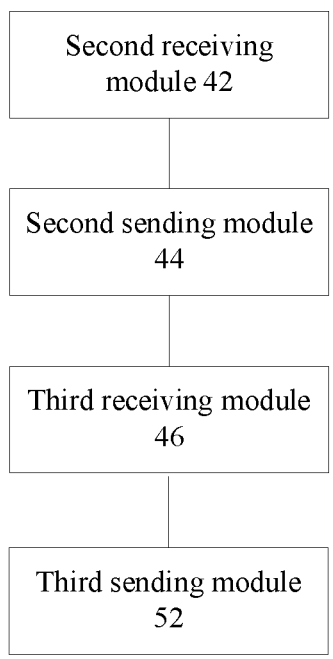
FIG. 5 is a first exemplary structure block diagram of a device for receiving random access configuration information according to an embodiment of the disclosure.

FIG. 5 is a first exemplary structure block diagram of a device for receiving random access configuration information according to an embodiment of the disclosure. As shown in FIG. 5, the device may further include, besides all the modules shown in FIG. 4, a third sending module 52. The module will be described below.

The third sending module 52 is coupled to the third receiving module 46, and is arranged to send random access signalling to the first-class node according to the random access configuration information.

The resource allocation information of first-class reference signals may include at least one of: number information of first-class reference signal subsets included in a first-class reference signal set; number information of first-class reference signals included in each first-class reference signal subset; or information of first-class reference signals included in each first-class reference signal subset.

The specific random access configuration information may include random access configuration information of a second-class node in a specific set.

The second-class node in the specific set may include: a second-class node which sends one or more first-class reference signals belonging to a same first-class reference signal subset in a determined time-frequency resource set.

The second sending module may be arranged to send the one or more first-class reference signals in a determined time-domain resource set. The determined time-domain resource set may be continuously distributed on a frequency domain and/or a time domain, or the determined time-domain resource set may be discretely distributed on a frequency domain and/or a time domain.

The determined time-domain resource set may include at least one of: a time-domain resource set configured in a manner of sending the time-domain resource set to the second-class node by the first-class node through signalling; or a time-domain resource set configured in the first-class node and the second-class node in a predetermined manner.

The first-class reference signal set and/or the first-class reference signal subset are/is configured in at least one of the following manners. The first-class reference signal set and/or the first-class reference signal subset are/is configured in a manner of sending the first-class reference signal set and/or the first-class reference signal subset to the second-class node by the first-class node. The first-class reference signal set and/or the first-class reference signal subset are/is configured in the first-class node and the second-class node in a predetermined manner.

Figure 6:
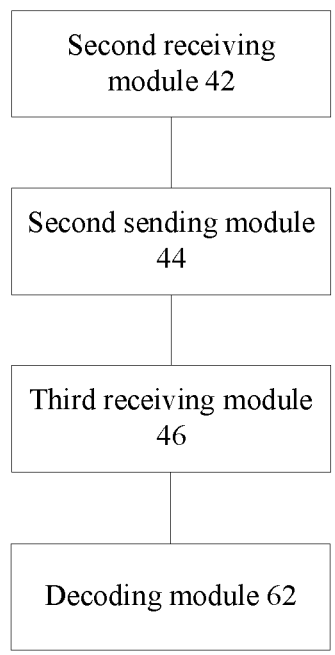
FIG. 6 is a second exemplary structure block diagram of a device for receiving random access configuration information according to an embodiment of the disclosure.

FIG. 6 is a second exemplary structure block diagram of a device for receiving random access configuration information according to an embodiment of the disclosure. As shown in FIG. 6, the device may further include, besides all the modules shown in FIG. 4, a decoding module 62. The decoding module 62 will be described below.

The decoding module 62 is coupled to the third receiving module 46, and is arranged to, when the second-class node has yet not sent the one or more first-class reference signals before receiving the random access configuration information sent by the first-class node, decode the received specific random access configuration information.

Figure 7:
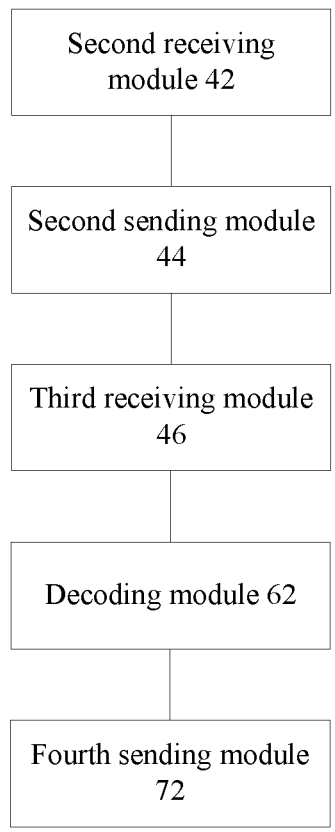
FIG. 7 is a third exemplary structure block diagram of a device for receiving random access configuration information according to an embodiment of the disclosure.

FIG. 7 is a third exemplary structure block diagram of a device for receiving random access configuration information according to an embodiment of the disclosure. As shown in FIG. 7, the device may further include, besides all the modules shown in FIG. 6, a fourth sending module 72. The module will be described below.

The fourth sending module 72 is coupled to the decoding module 62, and is arranged to, under a condition that the decoding module 62 fails in decoding, send the one or more first-class reference signals.

A type of the one or more first-class reference signals may include at least one of: a predetermined signal, a predetermined sequence, an orthogonal sequence, a quasi-orthogonal sequence or a pseudo-random sequence, and the orthogonal sequence may include a Zadoff chu sequence.

The random access configuration information may include at least one of: PRACH configuration information, random access signalling configuration information, or indication information indicating whether to resend the one or more first-class reference signals or not.

The PRACH configuration information may include at least one of: distribution information of time-domain and frequency-domain resources occupied by a PRACH in a determined period; duration information of a PRACH; starting time information of a PRACH; or ending time information of a PRACH.

A duration of the PRACH may include one or more determined periods.

The determined period may include at least one of: a period configured in a manner of sending the period to the second-class node by the first-class node through signalling; or a period configured in the first-class node and the second-class node in a predetermined manner.

The starting time information of the PRACH may include: a moment after an ending moment of the determined time-domain resource set by an interval of a predetermined number of time-domain measurement units.

The random access signalling configuration information may include at least one of: a type of a random access sequence, a length of a random access sequence, index information of one or more random access sequences, length configuration information of a circle prefix in random access signalling, length configuration information of a circle postfix in a random access signalling, or circle shift configuration information of a random access sequence.

The type of the random access sequence may include at least one of: a predetermined sequence, an orthogonal sequence, a quasi-orthogonal sequence or a pseudo-random sequence, and the orthogonal sequence may include a Zadoff chu sequence.

The device for receiving random access configuration information may further include at least one of the followings. The type of the random access sequence is the same as a type of the one or more first-class reference signals. A length of the circle prefix in the random access signalling is determined based on a measured maximum delay of the one or more first-class reference signals received by the first-class node. A length of the circle postfix in the random access signalling is determined based on a measured maximum delay of the one or more first-class reference signals received by the first-class node. A length of a circle shift of the random access sequence is determined based on a measured maximum delay of the one or more first-class reference signals received by the first-class node.

The first-class node may include at least one of: a macro cell, a micro cell, a pico cell, a femto cell, a home cell, an LPN or a relay.

Figure 8:
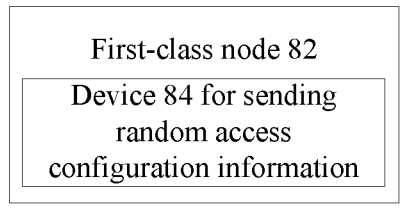
FIG. 8 is a structure block diagram of a first-class node according to an embodiment of the disclosure.

FIG. 8 is a structure block diagram of a first-class node according to an embodiment of the disclosure. As shown in FIG. 8, the first-class node 82 may include any abovementioned device for sending random access configuration information 84.

In an exemplary embodiment, the first-class node may include at least one of: a macro cell, a micro cell, a pico cell, a femto cell, a home cell, an LPN or a relay.

Figure 9:
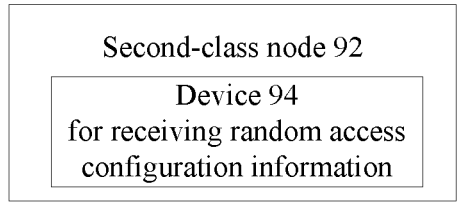
FIG. 9 is a structure block diagram of a second-class node according to an embodiment of the disclosure.

FIG. 9 is a structure block diagram of a second-class node according to an embodiment of the disclosure. As shown in FIG. 9, the second-class node 92 may include any abovementioned device for receiving random access configuration information 94.

In an exemplary embodiment, the second-class node may include at least one of: H2H communication UE; M2M communication UE; or D2D communication UE.

The disclosure will be described below with reference to some more specific embodiments.

First Embodiment

There may be one or more nodes and some UEs in a wireless system.

The one or more nodes may include at least one of: a macro cell, a micro cell, a pico cell, a femto cell, a home cell, an LPN or a relay.

The UEs may be at least one of:
one or more H2H communication UEs;
one or more M2M communication UEs; or
one or more D2D communication UEs.

At act 1, the following operations may be performed.

In the embodiment, it is supposed that there exist UE1, UE2, UE3, UE4, UE5 and UE6. The UEs send reference signals to a node (recorded as Node A) in the system at first for accessing the wireless system. Each reference signal may be one or more orthogonal sequences or one or more quasi-orthogonal sequences or one or more pseudo-random sequences. In the embodiment, the reference signal may be, for example, Zadoff chu sequences. The Node A notifies the UE of indexes of the Zadoff chu sequences which may be used as the reference signals. In the embodiment, it is supposed that sequences 1 to 10 are used as Zadoff chu sequences available for the UE.

Figure 10:
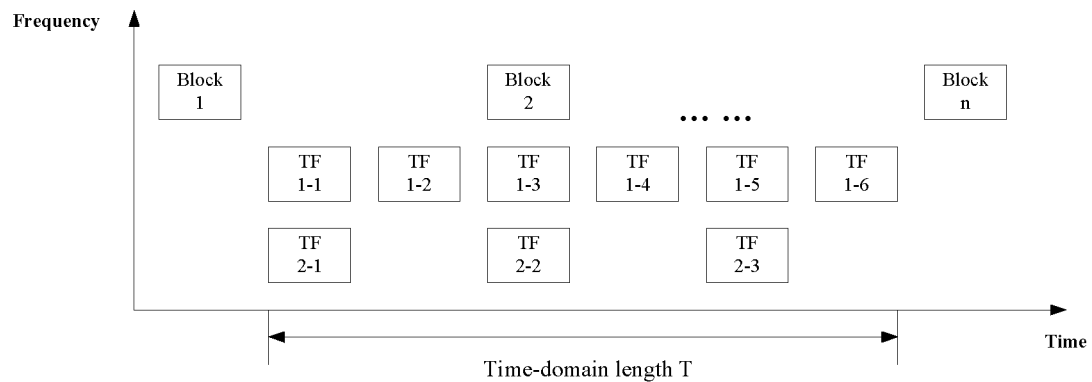
FIG. 10 is a first schematic diagram of random access resource allocation according to an embodiment of the disclosure.

Each UE in UEs 1 to 6 randomly selects one sequence from the sequences 1 to 10 as the reference signal, and sends the reference signal on a time-frequency resource indicated by the Node A. A location of the time-frequency resource may adopt the location shown in FIG. 10. FIG. 10 is a first schematic diagram of random access resource allocation according to an embodiment of the disclosure. As shown in FIG. 10, blocks 1 to n are the time-frequency resources for sending the reference signals. The blocks 1 to n occupy the same frequency resource, and are discretely distributed on a time domain. Time intervals between blocks may be the same or different. In the embodiment, UEs 1 to 3 all randomly select the sequence 1 for sending on the block 1, and UEs 4 to 6 all randomly select the sequence 5 for sending on the block 1.

At act 2, the following operations may be performed.

When receiving and detecting the reference signals on the block 1, the Node A learns about that the sequence 1 and the sequence 5 are sent, and judges that three UEs send the sequence 1 and the sequence 5 respectively according to energy of the detected sequence 1 and sequence 5. The Node A may send two sets of random access configuration information, recorded as random access configuration information 1 and random access configuration information 2, for the sequence 1 and the sequence 5 respectively.

The random access configuration information may include: PRACH configuration information and random access signalling configuration information.

In an exemplary embodiment, the PRACH configuration information may include:
distribution information of a time-frequency resource occupied by a PRACH in a predetermined period T.

In the embodiment, the PRACH configuration information sent for the sequence 1 by the Node A is recorded as PRACH configuration information 1. The PRACH configuration information 1 may include distribution information of the time-frequency resource occupied by the PRACH within a time period having a time-domain length of T, as shown by TF1-1 to TF1-6 in FIG. 10. The PRACH configuration information sent for the sequence 5 by the Node A is recorded as PRACH configuration information 2. The PRACH configuration information 2 may include distribution information of the time-frequency resource occupied by the PRACH within the time period having the time-domain length of T, as shown by TF2-1 to TF2-3 in FIG. 10.

In an exemplary embodiment, the random access signalling configuration information may include at least one of:

a type of a random access sequence;
a length of a random access sequence;
index information of one or more random access sequences; or
length configuration information of a circle prefix in random access signalling.

In the embodiment, the random access signalling configuration information sent for the sequence 1 by the Node A is recorded as random access signalling configuration information 1. The random access signalling configuration information 1 may include:

the type of the random access sequence, which is a Zadoff chu sequence with the same structure as the reference signal;

the length of the random access sequence, which is the same as the reference signal;

circle shift configuration information N1cs (which indicates a circle shift difference between two adjacent random access sequences) of the random access sequence;

index information of selectable random access sequences, such as an index 1 to an index 4, a number of the configured random access sequences may be determined by the Node A according to a number of the detected UEs which send the sequence 1, and furthermore, for reducing a conflict and collision probability, the number of the random access sequences allocated by the Node A may be larger than the number of UEs which send the sequence 1 detected by the Node A; and length configuration information N1cp of a circle prefix in the random access signalling, a length of the N1cp and/or the length N1zc of the random access sequence may be determined by the Node A according to a measured maximum delay of the received sequence 1.

In the embodiment, the random access signalling configuration information sent for the sequence 5 by the Node A is recorded as random access signalling configuration information 2. The random access signalling configuration information 2 may include:

the type of the random access sequence, which is a Zadoff chu sequence with the same structure as the reference signal;

the length of the random access sequence, which is the same as the reference signal;

circle shift configuration information N2cs (which indicates a circle shift difference between two adjacent random access sequences) of the random access sequence;

index information of selectable random access sequences, such as the index 1 to an index 6, a number of the configured random access sequences may be determined by the Node A according to a number of the detected UEs which send the sequence 5, and furthermore, for reducing the conflict and collision probability, the number of the random access sequences allocated by the Node A may be larger than the number of UEs which send the sequence 5 detected by the Node A; and length configuration information N2cp of the circle prefix in the random access signalling, a length of the N2cp and/or the length N2zc may be determined by the Node A according to a measured maximum delay of the received sequence 5.

At act 3, the following operations may be performed.

UEs 1 to 3 decode the random access configuration information 1. Each UE randomly selects a time-frequency resource in TF1-1 to TF1-6 for sending the random access sequence, and indexes of the random access sequences may be randomly selected from the index 1 to the index 4.

UEs 4 to 6 decode the random access configuration information 2. Each UE randomly selects a time-frequency resource in TF2-1 to TF2-3 for sending the random access sequence, and indexes of the random access sequences may be randomly selected from the index 1 to the index 6.

Second Embodiment

There may be one or more nodes and some UEs in a wireless system.

At act 1, the following operations may be performed.

In the embodiment, it is supposed that there exist UE1, UE2, UE3, UE4, UE5 and UE6. The UEs send reference signals to a node (recorded as Node A) in the system at first for accessing the wireless system, and the reference signals may be multiple orthogonal sequences. The Node A notifies the UE of indexes which may be used as the reference signals. In the embodiment, it is supposed that sequences 1 to 10 are used as reference signals available for the UE.

Figure 11:
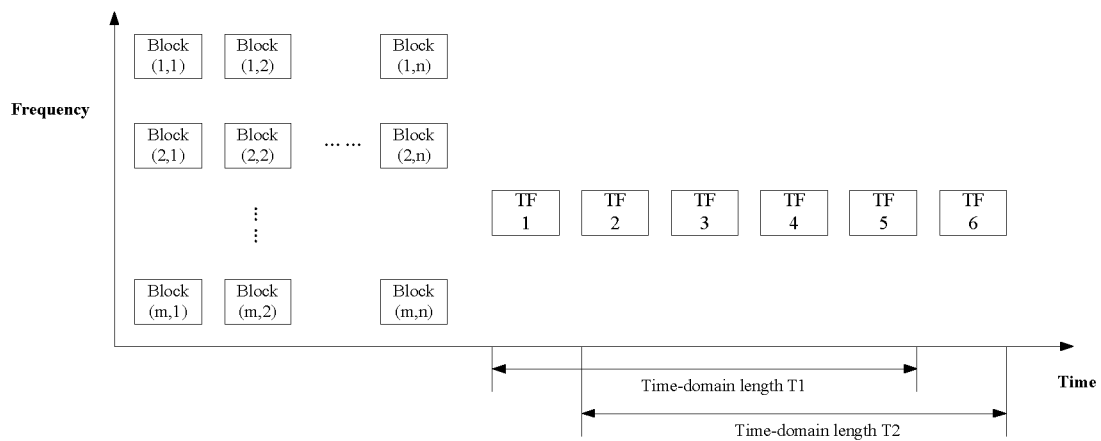
FIG. 11 is a second schematic diagram of random access resource allocation according to an embodiment of the disclosure.

Each UE in UEs 1 to 6 randomly selects one sequence from the sequences 1 to 10 as the reference signal, and sends the reference signal on a time-frequency resource indicated by the Node A. A location of the time-frequency resource may adopt the location shown in FIG. 11. FIG. 11 is a second schematic diagram of random access resource allocation according to an embodiment of the disclosure. As shown in FIG. 11, a block (1,1) to a block (m,n) are the time-frequency resources for sending the reference signals, and are discretely distributed on a time domain and a frequency domain. In the embodiment, UEs 1 to 4 all randomly select the sequence 1 for sending on the block (1,1) to the block (m,n), and UEs 5 to 6 both randomly select the sequence 2 for sending on the block (1,1) to the block (m,n). Each block resource may support sending of all the reference signals.

At act 2, the following operations may be performed.

When receiving and detecting the reference signals on the block (1,1) to the block (m,n), the Node A learns about that the sequence 1 and the sequence 2 are sent, and judges numbers of the UEs which send the sequence 1 and the sequence 2 respectively according to energy of the detected sequence 1 and sequence 2. A judgment principle may be embodied as follows.

The Node A predefines multiple energy judgment threshold values, such as TH1, TH2, . . . THmax, which meet a condition that TH1<TH2< . . . <THmax. The Node A judges the number of the detected UEs according to that the energy of the detected sequences meet different threshold value intervals. Each threshold value interval may form a mapping relationship with the judged and detected number of the UEs.

In the embodiment, the Node A judges the numbers of the UEs which send the sequence 1 and the sequence 2 respectively according to the judgment principle. For example, it is judged that four UEs send the sequence 1 and three UEs send the sequence 2. The Node A may send two sets of random access configuration information, recorded as random access configuration information 1 and random access configuration information 2, for the sequence 1 and the sequence 2 respectively.

The random access configuration information may include: PRACH configuration information and random access signalling configuration information.

In an exemplary embodiment, the PRACH configuration information may include:

distribution information of a time-frequency resource occupied by a PRACH in a predetermined period T.

In the embodiment, the PRACH configuration information sent for the sequence 1 by the Node A is recorded as PRACH configuration information 1. The PRACH configuration information 1 may include distribution information of the time-frequency resource occupied by the PRACH within a time period having a time-domain length of T1, as shown by TF1 to TF5 in FIG. 11. The PRACH configuration information sent for the sequence 2 by the Node A is recorded as PRACH configuration information 2. The PRACH configuration information 2 may include distribution information of the time-frequency resource occupied by the PRACH within a time period having a time-domain length of T2, as shown by TF1, TF3 and TF5 in FIG. 11.

In an exemplary embodiment, the random access signalling configuration information may include at least one of:

a type of a random access sequence;

a length of a random access sequence;

index information of one or more random access sequences;

length configuration information of a circle prefix in the random access signalling; or length configuration information of a circle postfix in a random access signalling.

In the embodiment, the random access signalling configuration information sent for the sequence 1 by the Node A is recorded as random access signalling configuration information 1. The random access signalling configuration information 1 may include:

the type of the random access sequence, which is an orthogonal sequence;

the length N1 of the random access sequence;

index information of selectable random access sequences, such as an index 1 to an index 8, a number of the configured random access sequences may be determined by the Node A according to the number of the detected UEs which send the sequence 1, and furthermore, for reducing a conflict and collision probability, the number of the random access sequences allocated by the Node A may be larger than the number of UEs which send the sequence 1 detected by the Node A;

length configuration information N1circleprefix of a circle prefix in the random access signalling; and length configuration information N1circlepostfix of a cyclic postfix in the random access signalling.

Furthermore, the N1circleprefix and/or N1circlepostfix and/or N1 may be determined by the Node A according to a measured maximum delay of the received sequence 1.

In the embodiment, the random access signalling configuration information sent for the sequence 2 by the Node A is recorded as random access signalling configuration information 2. The random access signalling configuration information 2 may include:

the type of the random access sequence, which is a predefined sequence;

the length N2 of the random access sequence;

index information of selectable random access sequences, such as an index 9 to an index 14, a number of the configured random access sequences may be determined by the Node A according to a number of the detected UEs which send the sequence 2, and furthermore, for reducing the conflict and collision probability, the number of the random access sequences allocated by the Node A may be larger than the number of UEs which send the sequence 2 detected by the Node A; and length configuration information N2cp of the circle prefix in the random access signalling, the N2cp and/or N2 may be determined by the Node A according to a measured maximum delay of the received sequence 2.

At act 3, the following operations may be performed.

UEs 1 to 4 decode the random access configuration information 1. Each UE randomly selects a time-frequency resource in TF1 to TF6 for sending the random access sequence, and indexes of the random access sequences may be randomly selected from the index 1 to the index 8.

UEs 5 to 6 decode the random access configuration information 2. Each UE randomly selects a time-frequency resource in TF1, TF3 and TF5 for sending the random access sequence, and indexes of the random access sequences may be randomly selected from the index 9 to the index 14.

Besides the embodiment, the reference signals sent to the Node A may also be at least one of:

one or more predefined signals;

one or more predefined sequences;

one or more orthogonal sequences;

one or more quasi-orthogonal sequences; or one or more pseudo-random sequences.

Third Embodiment

There may be one or more nodes and some UEs in a wireless system.

At act 1, the following operations may be performed.

In the embodiment, it is supposed that there exist UE1, UE2, UE3, UE4, UE5 and UE6. The UEs send reference signals to a node (recorded as Node A) in the system at first for accessing the wireless system, and the reference signals may be multiple orthogonal sequences. The Node A notifies the UE of indexes which may be used as the reference signals. In the embodiment, it is supposed that sequences 1 to 10 are used as reference signals available for the UE.

Figure 12:
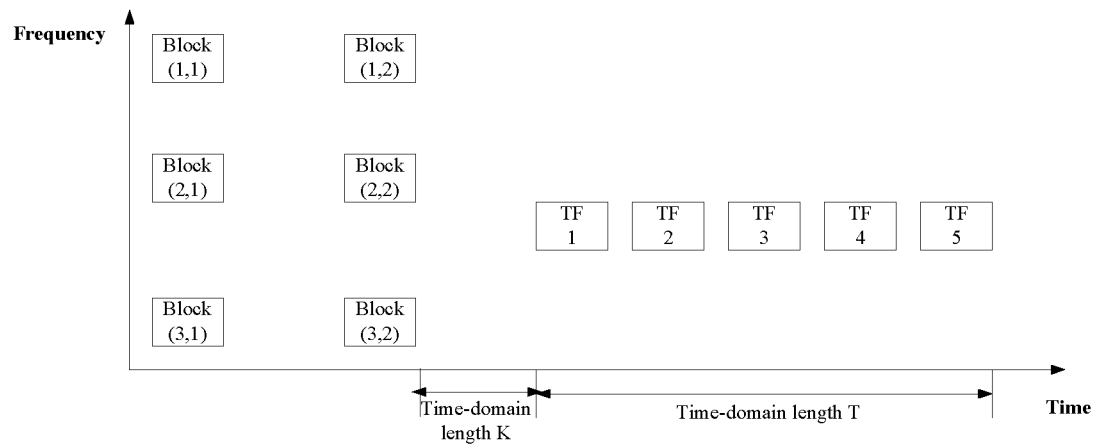
FIG. 12 is a third schematic diagram of random access resource allocation according to an embodiment of the disclosure.

Each UE in UEs 1 to 6 randomly selects multiple sequences from the sequences 1 to 10 as reference signals, and sends the reference signals on a time-frequency resource indicated by the Node A. A location of the time-frequency resource may adopt the location shown in FIG. 12. FIG. 12 is a third schematic diagram of random access resource allocation according to an embodiment of the disclosure. As shown in FIG. 12, a block (1,1) to a block (3,2) are the time-frequency resources for sending the reference signals, and may be discretely distributed on a time domain and a frequency domain. In the embodiment, UE1 randomly selects the sequences 1, 2 and 3, sends the sequence 1 on the block (1,1) and a block (1,2), sends the sequence 2 on a block (2,1) and a block (2,2), and sends the sequence 3 on a block (3,1) and the block (3,2). UEs 2 to 6 all randomly select the sequences 4, 5 and 6, send the sequence 4 on the block (1,1) and the block (1,2), send the sequence 5 on the block (2,1) and the block (2,2), and send the sequence 6 on the block (3,1) and the block (3,2). Each block resource can support sending of all the reference signals.

At act 2, the following operations may be performed.

When receiving and detecting the reference signals on the block (1,1) to the block (3,2), the Node A judges numbers of the UEs which send the reference signals respectively according to energy of the detected sequence 1 to sequence 6. A judgment principle may be embodied as follows.

The Node A predefines multiple energy judgment threshold values, such as TH1, TH2, . . . THmax, which meet a condition that TH1<TH2< . . . <THmax. The Node A judges the number of the detected UEs according to that the energy of the detected sequences meet different threshold value intervals. Each threshold value interval may form a mapping relationship with the judged and detected number of the UEs.

In the embodiment, the Node A judges that one UE sends the sequences 1 to 3 according to the energy of the detected sequences 1 to 3, and judges that five UEs send the sequences 4 to 6 according to the energy of the detected sequences 4 to 6.

The Node A judges that one UE sends the sequences 1 to 3, and then the Node A sends response signalling for the sequences 1 to 3. The signalling may include at least one of:
Identity (ID) information allocated to the UE;
uplink resource information allocated to the UE; or
modulation and coding information allocated to the UE.

Furthermore, the response signalling may form a mapping relationship with the sequences 1 to 3, that is, only the UEs which send the sequences 1 to 3 may successfully decode the response signalling.

The Node A may send a set of random access configuration information for the sequences 4 to 6.

The random access configuration information may include: PRACH configuration information and random access signalling configuration information.

In an exemplary embodiment, the PRACH configuration information may include:
distribution information of a time-frequency resource occupied by a PRACH in a predetermined period T;
starting of the PRACH K time-domain measurement units after the time-frequency resource occupied by these reference signals in the block (1,1) to the block (3,2); and
a duration M×T of the PRACH.

In the embodiment, the PRACH configuration information sent for the sequences 4 to 6 by the Node A is recorded as PRACH configuration information. The PRACH configuration information may include distribution information of the time-frequency resource occupied by the PRACH within a time period having a time-domain length of T, as shown by TF1 to TF5 in FIG. 12.

In an exemplary embodiment, the random access signalling configuration information may include at least one of:
a type of a random access sequence;
a length of a random access sequence;
index information of one or more random access sequences;
length configuration information of a circle prefix in the random access signalling; or
length configuration information of a circle postfix in a random access signalling.

In the embodiment, the random access signalling configuration information sent for the sequences 4 to 6 by the Node A is recorded as random access signalling configuration information. The random access signalling configuration information may include:
the type of the random access sequence, which is an orthogonal sequence;
the length N of the random access sequence;
index information of selectable random access sequences, such as an index 1 to an index 20, and a number of the configured random access sequences may be determined by the Node A;
length configuration information Ncircleprefix of a circle prefix in the random access signalling; and
length configuration information Ncirclepostfix of a cyclic postfix in the random access signalling.

Furthermore, the Ncircleprefix and/or the Ncirclepostfix and/or N may be determined by the Node A according to a measured maximum delay of the received sequences 4 to 6.

At act 3, the following operations may be performed.

UE1 decodes the response signalling, and sends uplink data according to an uplink resource and modulation and coding scheme configured in the response signalling.

UEs 2 to 6 decode the random access configuration information. Each UE randomly selects a time-frequency resource in TF1~TF5 for sending the random access sequence, and indexes of the random access sequences may be randomly selected from the index 1 to the index 20.

At act 4, the following operations may be performed.

In the embodiment, if the random access sequence sent by the UE2 does not receive any response of the Node A, the UE2 is suggested to execute the following operations.

The UE2 judges whether the PRACH allocated by the Node A in act 2 still exists or not, namely whether "the duration N×T of the PRACH" ends or not. If the judgment result is negative, the UE2 randomly selects a time-frequency resource from PRACHs, allocated by the Node A, received before for sending the random access sequence, the index of the random access sequence being randomly selected from the index 1 to the index 20. If the judgment result is positive, the UE2 is suggested to resend the reference signal to the Node A.

Fourth Embodiment

There may be one or more nodes and some UEs in a wireless system.

At act 1, the following operations may be performed.

In the embodiment, it is supposed that there exist UE1, UE2, UE3, UE4, UE5 and UE6. The UEs send reference signals to a node (recorded as Node A) in the system at first for accessing the wireless system, and the reference signals may be multiple orthogonal sequences. The Node A notifies the UE of indexes which may be used as the reference signals. In the embodiment, it is supposed that sequences 1 to 10 are used as reference signals available for the UE.

Figure 13:
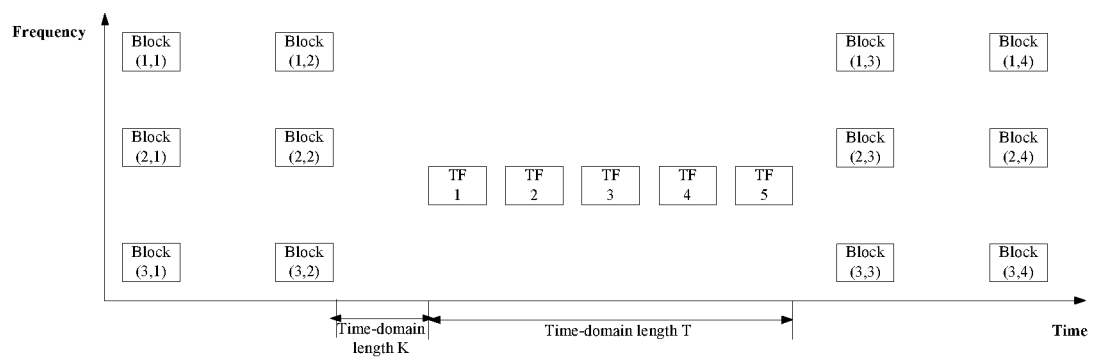
FIG. 13 is a fourth schematic diagram of random access resource allocation according to an embodiment of the disclosure.

Each UE in UEs 1 to 4 randomly selects multiple sequences from the sequences 1 to 10 as the reference signals, and sends the reference signals on a time-frequency resource indicated by the Node A. A location of the time-frequency resource may adopt the location shown in FIG. 13. FIG. 13 is a fourth schematic diagram of random access resource allocation according to an embodiment of the disclosure. As shown in FIG. 13, a block (1,1) to a block (3,2) are the time-frequency resources for sending the reference signals, and may be discretely distributed on a time domain and a frequency domain. In the embodiment, UEs 1 to 4 all randomly selects the sequence 1. Each block resource may support sending of all the reference signals.

At act 2, the following operations may be performed.

When receiving and detecting the reference signals on the block (1,1) to the block (3,2), the Node A judges a number of the UEs which send the reference signals respectively according to energy of the detected sequence 1. In the embodiment, the Node A judges that four UEs send the sequence 1 according to the energy of the detected sequence 1. The Node A may send a set of random access configuration information for the sequence 1. The random access configuration information may include: PRACH configuration information and random access signalling configuration information.

In an exemplary embodiment, the PRACH configuration information may include:
- distribution information of a time-frequency resource occupied by a PRACH in a predetermined period T;
- a starting moment of the PRACH: starting K time-domain measurement units after the time-frequency resource occupied by these reference signals in the block (1,1) to the block (3,2); and
- a duration M×T of the PRACH, where M is more than or equal to 1.

In the embodiment, the distribution information of the time-frequency resource occupied by the PRACH within a time period having a time-domain length of T is shown by TF1 to TF5 in FIG. 13.

In an exemplary embodiment, the random access signalling configuration information may include at least one of:
- a type of a random access sequence;
- a length of a random access sequence;
- index information of one or more random access sequences;
- length configuration information of a circle prefix in the random access signalling; or
- length configuration information of a circle postfix in a random access signalling.

In the embodiment, the random access signalling configuration information sent for the sequence 1 by the Node A may include:
- the type of the random access sequence, which is an orthogonal sequence;
- the length N of the random access sequence;
- index information of selectable random access sequences, such as an index 1 to an index 20, and a number of the configured random access sequences may be determined by the Node A;
- length configuration information Ncircleprefix of a circle prefix in the random access signalling; and
- length configuration information Ncirclepostfix of a cyclic postfix in the random access signalling.

The Ncircleprefix and/or the Ncirclepostfix and/or N may be determined by the Node A according to a measured maximum delay of the received sequence 1.

At act 3, the following operations may be performed.

UEs 1 to 4 decode the random access configuration information. Each UE randomly selects a time-frequency resource in TF1~TF5 for sending the random access sequence, and indexes of the random access sequences may be randomly selected from the index 1 to the index 20.

At act 4, the following operations may be performed.

In the embodiment, if the UE5 and the UE6 do not send the reference signals in the block (1,1) to the block (3,2), the UE5 and the UE6 may try to perform blind detection on the PRACH configuration information sent by the Node A. For example, the UE5 may randomly select to try to perform blind detection on PRACH configuration information associated with the sequence 1, the sequence 2 and the sequence 3, and the UE6 may try to perform blind detection on PRACH configuration information associated with the sequence 4, the sequence 5 and the sequence 6.

The UE5 successfully decodes the random access configuration information sent for the sequence 1 by the Node A. The UE5 randomly selects a time-frequency resource from TF1~TF5 for sending a random access sequence, and an index of the random access sequence may be selected from the index 1 to the index 20.

The UE6 does not successfully decode the random access configuration information, and then send the reference signal in a block (1,3) to a block (3,4).

By each abovementioned embodiment, a large number of users may be ensured to successfully access the system, system resource overhead may also be controlled, and spectrum efficiency is improved.

Obviously, those skilled in the art should know that each module or each act of the disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the disclosure is not limited to any specific hardware and software combination.

The above is only the exemplary embodiment of the disclosure and not intended to limit the disclosure. For those skilled in the art, the disclosure may have various modifications and variations. Any modifications, equivalent replacements, improvements and the like made within the principle of the disclosure shall fall within the scope of protection defined by the appended claims of the disclosure.

INDUSTRIAL APPLICABILITY

As mentioned above, the methods for sending or receiving random access configuration information, the devices for sending or receiving random access configuration information, the first-class node and the second-class node provided by the embodiments of the disclosure have the following beneficial effects: the problem that a system access solution for users in the related communication technology may cause high system resource overhead during access of a large number of users is solved, and an effect of reducing the resource overhead is further achieved.

What is claimed is:

1. A method for sending random access configuration information, comprising:
    receiving, by a first-class node, one or more first-class reference signals sent by multiple second-class nodes, wherein the multiple second-class nodes comprise a node which sends one or more first-class reference signals, which belong to a same first-class reference signal subset, in a determined time-domain resource set, a first-class reference signal set comprises one or more first-class reference signal subsets and each first-class reference signal subset comprises one or more first-class reference signals, a type of the one or more first-class reference signals comprises at least one of: a predetermined signal, a predetermined sequence, an orthogonal sequence, a quasi-orthogonal sequence or a pseudo-random sequence, wherein the orthogonal sequence comprises a Zadoff chu sequence;
    judging, by the first-class node, the number of the multiple second-class nodes according to the energy of the one or more received first-class reference signals, and determining, by the first-class node, random access configuration information corresponding to the one or more received first-class reference signals to the multiple second-class nodes based on the number of the multiple second-class nodes, wherein the random access configuration information comprises at least one of: Physical Random Access Channel (PRACH) configuration information, random access signalling configuration information, indication information indicating whether to resend the one or more first-class reference signals or not; and sending, by the first-class node, different random access configuration information corresponding to different first-class reference signal subsets to which received first-class reference signals belong to different second-class nodes.

2. The method as claimed in claim 1, wherein the PRACH configuration information comprises at least one of:
   distribution information of time-domain and frequency-domain resources occupied by a PRACH in a determined period;
   duration information of a PRACH;
   starting time information of a PRACH; or
   ending time information of a PRACH.

3. The method as claimed in claim 2, wherein the duration of the PRACH comprises one or more determined periods.

4. The method as claimed in claim 2, wherein the starting time information of the PRACH comprises:
   a moment after an ending moment of the determined time-domain resource set by an interval of a predetermined number of time-domain measurement units.

5. A method for receiving random access configuration information, comprising:
   receiving, by a second-class node, resource allocation information, sent by a first-class node, of first-class reference signals;
   sending, by the second-class node, one or more first-class reference signals selected from a first-class reference signal subset to the first-class node according to the received resource allocation information of first-class reference signals, wherein a type of the one or more first-class reference signals comprises at least one of: a predetermined signal, a predetermined sequence, an orthogonal sequence, a quasi-orthogonal sequence or a pseudo-random sequence, wherein the orthogonal sequence comprises a Zadoff chu sequence; and
   judging, by a first-class node, the number of the multiple second-class nodes according to the energy of the one or more received first-class reference signals, and determining, by the first-class node, specific random access configuration information corresponding to the one or more received first-class reference signals to the multiple second-class nodes based on the number of the multiple second-class nodes;
   receiving, by the second-class node, the specific random access configuration information sent by the first-class node, wherein the specific random access configuration information comprises at least one of: Physical Random Access Channel (PRACH) configuration information, random access signalling configuration information, indication information indicating whether to resend the one or more first-class reference signals or not.

6. The method as claimed in claim 5, after receiving, by the second-class node, the specific random access configuration information sent by the first-class node, further comprising:
   sending a random access signalling to the first-class node according to the specific random access configuration information.

7. The method as claimed in claim 5, wherein the resource allocation information of first-class reference signals comprises at least one of:
   number information of first-class reference signal subsets comprised in a first-class reference signal set;
   number information of first-class reference signals comprised in each first-class reference signal subset; or
   information of first-class reference signals comprised in each first-class reference signal subset.

8. The method as claimed in claim 5, wherein the specific random access configuration information comprises random access configuration information of the second-class node in a specific set.

9. The method as claimed in claim 8, wherein the specific set comprises: a second-class node which sends one or more first-class reference signals belonging to a same first-class reference signal subset in a determined time-frequency resource set.

10. The method as claimed in claim 5, in a case that the second-class node has yet not sent the one or more first-class reference signals before receiving the specific random access configuration information sent by the first-class node, after receiving, by the second-class node, the specific random access configuration information sent by the first-class node, further comprising:
    decoding, by the second-class node, the received specific random access configuration information.

11. The method as claimed in claim 10, wherein, under a condition that the second-class node fails to decode the received specific random access configuration information, the second-class node sends the one or more first-class reference signals.

12. The method as claimed in claim 5, wherein the PRACH configuration information comprises at least one of:
    distribution information of time-domain and frequency-domain resources occupied by a PRACH in a determined period;
    duration information of a PRACH;
    starting time information of a PRACH; or
    ending time information of a PRACH.

13. The method as claimed in claim 12, wherein the duration of the PRACH comprises one or more determined periods; or, the starting time information of the PRACH comprises: a moment after an ending moment of a determined time-domain resource set by an interval of a predetermined number of time-domain measurement units.

14. A device for sending random access configuration information, applied to a first-class node and comprising a hardware processor arranged to execute program modules comprising:
    a first receiving module, arranged to receive one or more first-class reference signals sent by multiple second-class nodes, wherein the multiple second-class nodes comprise a node which sends one or more first-class reference signals, which belong to a same first-class reference signal subset, in a determined time-domain resource set, a first-class reference signal set comprises one or more first-class reference signal subsets and each first-class reference signal subset comprises one or more first-class reference signals, and a type of the one or more first-class reference signals comprises at least one of: a predetermined signal, a predetermined sequence, an orthogonal sequence, a quasi-orthogonal sequence or a pseudo-random sequence, wherein the orthogonal sequence comprises a Zadoff chu sequence; and
    a first sending module, arranged to send different random access configuration information to different multiple second-class nodes according to different first-class reference signal subsets to which received first-class reference signals belong, wherein the random access configuration information comprises at least one of: Physical Random Access Channel (PRACH) configuration information, random access signalling configuration information, indication information indicating whether to resend the one or more first-class reference signals or not;

wherein the device is arranged to judge the number of the multiple second-class nodes according to the energy of the one or more received first-class reference signals, and determine the random access configuration information corresponding to the one or more received first-class reference signals based on the number of the multiple second-class nodes.

15. A device for receiving random access configuration information, applied to a second-class node and comprising a hardware processor arranged to execute program modules comprising:

a second receiving module, arranged to receive resource allocation information, sent by a first-class node, of first-class reference signals;

a second sending module, arranged to send one or more first-class reference signals selected from a first-class reference signal subset to the first-class node according to the received resource allocation information of first-class reference signals, wherein a type of the one or more first-class reference signals comprises at least one of: a predetermined signal, a predetermined sequence, an orthogonal sequence, a quasi-orthogonal sequence or a pseudo-random sequence, wherein the orthogonal sequence comprises a Zadoff chu sequence; and a third receiving module, arranged to receive specific random access configuration information sent by the first-class node, wherein the specific random access configuration information comprises at least one of: Physical Random Access Channel (PRACH) configuration information, random access signalling configuration information, indication information indicating whether to resend the one or more first-class reference signals or not;

wherein the first-class node judges the number of the multiple second-class nodes according to the energy of the one or more received first-class reference signals, and determines the specific random access configuration information corresponding to the one or more received first-class reference signals to the multiple second-class nodes based on the number of the multiple second-class nodes.

* * * * *